(12) United States Patent
Cho et al.

(10) Patent No.: US 8,643,751 B2
(45) Date of Patent: Feb. 4, 2014

(54) METHOD FOR DETECTING DEAD PIXELS AND COMPUTER PROGRAM PRODUCT THEREOF

(75) Inventors: Chao-Yi Cho, Taichung (TW); Tse-Min Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 97 days.

(21) Appl. No.: 13/475,403

(22) Filed: May 18, 2012

(65) Prior Publication Data

US 2013/0141595 A1 Jun. 6, 2013

(30) Foreign Application Priority Data

Dec. 2, 2011 (TW) .............................. 100144393 A

(51) Int. Cl.
*H04N 9/64* (2006.01)
(52) U.S. Cl.
USPC ...................................................... 348/246
(58) Field of Classification Search
USPC ...................................................... 348/246
See application file for complete search history.

(56) References Cited

U.S. PATENT DOCUMENTS

| 7,471,842 | B2 | 12/2008 | Wu et al. |
| 7,589,770 | B2 | 9/2009 | Chan |
| 7,649,555 | B2 | 1/2010 | Noh |
| 7,676,084 | B2 | 3/2010 | Noh et al. |
| 2004/0032516 | A1 | 2/2004 | Kakarala |
| 2008/0239114 | A1 | 10/2008 | Shin et al. |
| 2011/0013053 | A1 | 1/2011 | Chen et al. |
| 2011/0102624 | A1 | 5/2011 | Hashizume |

FOREIGN PATENT DOCUMENTS

TW 200828982 7/2008

OTHER PUBLICATIONS

Li et al., "Adaptive Order-Statistics Multi-Shell Filtering for Bad Pixel Correction within CFA Demosaicking", Proceedings of TENCON, pp. 1-6, Nov. 2009.
Bosco et al. "Hardware/Software Solution for High Precision Defect Correction in Digital Image Sensors", IEEE International Symposium on Consumner Electronics, pp. 1-4, Apr. 4, 2008.
Duads et al., "On-Line Mapping of In-Field Defects in Image Sensor Arrays", 21th IEEE International Symposium on Defect and Fault-Tolerance in VLSI Systems, pp. 439-447, Oct. 2006.
Xu et al., "Detection and Compensation of Bad Pixel for CMOS Image Sensor", International Conference on Sensors and Control Techniques, pp. 208-212, Jul. 1, 2000.
An et al., "Adaptive Detection and Concealment Algorithm of Defective Pixel", IEEE Workshop on Signal Processing System, pp. 651-656, Nov. 2007.

(Continued)

*Primary Examiner* — Roberto Velez
*Assistant Examiner* — Stephen Coleman
(74) *Attorney, Agent, or Firm* — Rabin & Berdo, P.C.

(57) ABSTRACT

A method for detecting dead pixels obtains a downsampling set formed by a plurality of sample pixels by downsampling a to-be-tested image, and computes a moving average for each sample pixel to determine whether the sample pixel is a dead pixel candidate. If so, all pixels in a neighborhood of the dead pixel candidate are determined as to-be-detected pixels. For each to-be-detected pixel, a compensated value and a weighted average under a mask are estimated. A hypothetic dead pixel value is obtained by comparing an original pixel value of each to-be-detected pixel and the moving average of the dead pixel candidate. Whether the to-be-detected pixel is a dead pixel is determined by using the original pixel value, the compensated value, the weighted average and the hypothetic dead pixel value.

22 Claims, 12 Drawing Sheets

(56) References Cited

OTHER PUBLICATIONS

Cho et al., "Real-Time Photo Sensor Dead Pixel Detection for Embedded Devices", 2011 International Conference on Digital Image Computing: Techniques and Applications, pp. 164-169, Dec. 6, 2011.

"DICTA 2011 Digital Image computing: Techniques and Applications", 2011 International Conference on Digital Image Computing: Techniques and Applications Noosa, Queensland, Australia, 6-8, pp. 1-109, Dec. 2011.

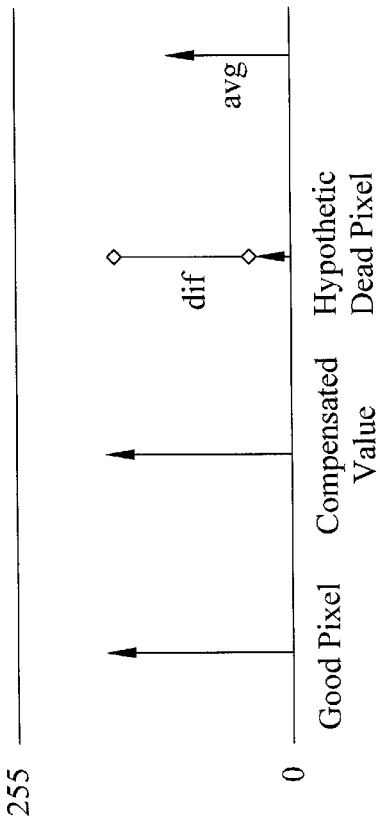
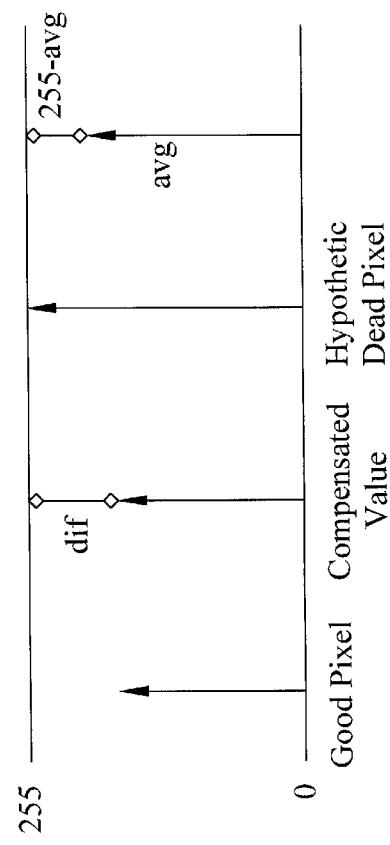
FIG. 8A
FIG. 8B

METHOD FOR DETECTING DEAD PIXELS AND COMPUTER PROGRAM PRODUCT THEREOF

CROSS-REFERENCE TO RELATED APPLICATION

The present application is based on, and claims priority from, Taiwan Application. No. 100144393, filed Dec. 2, 2011, the disclosure of which is hereby incorporated by reference herein in its entirety.

TECHNICAL FIELD

The present disclosure generally relates to a method for detecting dead pixels and computer program product.

BACKGROUND

An image sensing device such as image sensor or any kinds of image processing device works as a front-end unit for capturing image data, and is mainly composed of several semiconductors that are able to record light changes. It converts the optical signals into corresponding electric signals in response to incident light intensities, and further uses an analog-to-digital converter to convert the electric signals into digital signals. The digital signals are often stored in a pixel array form for the subsequent related processing by the image signal processors. However, even though the advanced manufacturing process technology such as complementary metal oxide semiconductor (CMOS) or charge couple device (CCD) is implemented, dead pixels still exist in an image pixel array due to the noise or fabrication errors or bias. In the disclosure, the pixels that are with inappropriate responsibility or unconvertible light intensities in pixels of an image are all referred as dead pixels.

Superficial characteristic of dead pixels, such as a significant difference with their surrounding pixels, results in damage to the visual effect of images. Take the image sensor as an example, to produce a sensor having 100% manufacturing yield rate is a very difficult challenge due to the characteristic of highly complicated process of the image sensor. Even the particle dust in a packaging process may result in losing accuracy of light sensitivity for a single pixel or multiple pixels. Therefore, in fabrication's point of view, it is inevitable for an image sensor that outputs a few dead pixels. Generally, the characteristic of such a dead pixel due to fabrication errors is that the pixel is no longer recovered once it is determined to be a dead pixel, i.e. the position of the dead pixel will not change for different usage times or environments. Based on the characteristic, it is common for the manufacturer to conduct the physical detection for this type of dead pixels (expected dead pixels) before shipment, and record their relevant information in a memory as a correction basis when the sensor is used.

Besides the fabrication process, the severe change of environment temperature may also result in abnormal semiconductor sensitivity and thus produce breaking dead pixels. Moreover, an image sensing device itself is gradually aging due to frequent usage, and appears defects not recorded before factory shipment. The common characteristic of this type of dead pixels (unexpected dead pixels) are all unpredictable and stochastic, so that it is unable to perform compensation based on the dead pixel information recorded in the memory.

For an image sensing device, the so-called dead pixel correction procedure comprises dead pixel detection and dead pixel compensation. Dead pixel detection aims to verify location of possible dead pixels while dead pixel compensation outputs corrected value for each possible dead pixel of known location by using its adjacent good pixels. They are operated separately, but the former must employ before the latter is in use. In existing non-real-time dead pixel correction procedures, the dead pixel detection makes an electric test and/or a luminescent and dim spot test before an image sensing device leaving the factory, and records their relevant dead pixel information. After factory shipment, dead pixel compensation is performed for expected dead pixels based on the known information before the image sensing device outputs each image. While in the real-time dead pixel correction procedures, detection and compensation are performed for the expected/unexpected dead pixels when operating the image sensing device, in order to have the opportunity to increase the usage life cycle and enhance the image quality of the image sensing device.

In some technology-related literatures, for example, one literature disclosed a dead pixel detection technology through a time period to expose. In one embodiment, a controller controls a specific exposure time of a sensor during the startup period of the sensor; then determines whether the obtained light responses are within a predetermined acceptance range, and records the coordinate information of those whose light responses are outside the predetermined acceptance range in a dead pixel distribution map. Upon operating the image sensing device, dead pixel compensation is performed according to the dead pixel distribution map. Another literature disclosed a dead pixel detection technology through a scene change. This technology utilizes the difference value between two image frames, i.e. a previous image frame and a current image frame, and observes whether the difference value complies with a predefined scene change criterion. Once a scene change is sensed, a dead pixel detection mechanism is activated. If a change in the intensity value of a pixel is less than a predefined threshold, it is considered as a dead pixel candidate. Once the number for a pixel being considered as a dead pixel candidate exceeds a predefined threshold value, the pixel is determined as a dead pixel.

Another literature disclosed a technology for combining demosaicing and dead pixel detection. This technology utilizes a median interpolation within a reference range to generate the missing color component of each pixel. If the difference value between a current processing pixel and the pixel within the reference range is greater than a predefined threshold, the current processing pixel is regarded as a dead pixel. Yet one literature disclosed a dead pixel detection technology by considering the pixel-changes within the image and sorting the pixel differences between the current pixel and the neighbor pixels. It is also coupled with the required image quality to detect dead pixels. Yet another literature disclosed a dead pixel detection technology by utilizing predefined defect models and a statistical likelihood to detect dead pixels.

FIG. 1A and FIG. 1B illustrate another real-time dead pixel detection technology. As shown in FIG. 1A, the to-be-detected pixel $G_5$ and its adjacent pixels ($G_1$~$G_4$ and $G_6$~$G_9$) are composited to a 3×3 matrix 100. The pixel $G_H$ with the second largest value and the pixel $G_L$ with the second smallest value are found from the matrix, and a difference value and an average value are computed as follows:

Difference value=$G_H - G_L$

Average value=$((G_1+G_2+G_3+G_4+G_5+G_6+G_7+G_8+G_9)-(G_5+G_H+G_L))/6$;

In the formula of calculating the average value, $G_5$, $G_H$, and $G_L$ are not involved in the average computation. In other words, the average value is the average of 6 adjacent pixels within the 3×3 matrix, and these 6 adjacent pixels are the pixels after removing $G_5$, $G_H$, and $G_L$ from pixels $G_1$ to $G_9$. As shown in FIG. 1B, if the to-be-detected pixel is in the range of (average value−difference value, average value+difference value), then it is a good pixel; in other words, if the to-be-detected pixel is not within the range, then it is a dead pixel.

In above and other technology associated literatures, some are unable to fully detect unexpected dead pixels appeared after a sensing device leaving the factory while even if others are able to detect unexpected dead pixels, the detection rate is not high for situations of large clustered dead pixels. The multimedia applications of existing electronic products contain a variety of voice, pictures, and video images, and continue to emerge, wherein the information sources of most electronic products are provided by the image sensing device. Keeping accuracy of input data is one of the prerequisites to ensure maximum performance of the algorithms on a variety of applications. Therefore, the real-time dead pixel detection technology of an image sensing device, which may be adapted to an embedded system's computations and still keep a high detection rate, is very worthy of study and development.

SUMMARY

The exemplary embodiments of the present disclosure may provide a method for detecting dead pixels and computer program product thereof.

One exemplary embodiment relates to a dead pixel detection method. The method comprises: capturing a to-be-tested image, and obtaining a downsampling set formed by a plurality of sample pixels by downsampling the to-be-tested image; computing a moving average for each sample pixel of the downsampling set to determine whether the sample pixel is a dead pixel candidate; determining all pixels of a neighborhood of said dead pixel candidate as to-be-detected pixels; estimating a compensated value and a weighted average value under a mask for each of the to-be-detected pixels; obtaining a hypothetic dead pixel value by comparing an original pixel value of each to-be-detected pixel and the moving average of the dead pixel candidate; and determining whether the to-be-detected pixel is a dead pixel by utilizing the original pixel value, the compensated value, the weighted average value, and the hypothetic dead pixel value.

Another exemplary embodiment relates to a computer program product to detect dead pixels, and comprises an executable computer program. The computer program is stored in a storage medium, and under control of a computer to perform: capturing a to-be-tested image and obtaining a downsampling set formed by a plurality of sample pixels by downsampling the to-be-tested image; computing a moving average for each sample pixel of the downsampling set to determine whether the sample pixel is a dead pixel candidate; determining all pixels of a neighborhood of said dead pixel candidate as to-be-detected pixels; estimating a compensated value and a weighted average value under a mask for each of the to-be-detected pixels; obtaining a hypothetic dead pixel value by comparing an original pixel value of each to-be-detected pixel and the moving average of the dead pixel candidate; and determining whether the to-be-detected pixel is a dead pixel by utilizing the original pixel value, the compensated value, the weighted average value, and the hypothetic dead pixel value.

The foregoing and other features and aspects of the disclosure will become better understood from a careful reading of a detailed description provided herein below with appropriate reference to the accompanying drawings.

BRIEF DESCRIPTION OF THE DRAWINGS

FIG. 8A is a schematic view for illustrating the characteristic of absolute difference value between a stuck low pixel value and its compensated value, according to an exemplary embodiment.

FIG. 8B is a schematic view for illustrating the characteristic of absolute difference value between a stuck high pixel value and its compensated value, according to an exemplary embodiment.

DETAILED DESCRIPTION OF DISCLOSED EMBODIMENTS

In the exemplary embodiments of the disclosed dead pixel detection technology, no matter what reason resulting in a dead pixel is, pixels that are unable to faithfully reacts light intensity information are all referred to as dead pixels. According to the exemplary embodiments, a linear equation y=mx+b is used to simulate an image sensing device with any input x and its corresponding output y, where m is the sensitivity of the image sensing device and is a positive value, and b is the bias. For example, the value for an 8-bit output is ranged between 0 and 255. With observing the linear equation, it may be found that the sensitivity of a good pixel faithfully responding to light intensity information should be 1, and its bias is 0; while the sensitivity of a dead pixel is non-one, and its bias is non-zero. For a k-bit output y, when m=0 and b closes to $2^k-1$, this output pixel of the image sensing device is called a stuck high pixel; when m=0 and b closes to 0, this output pixel of the image sensing device is called a stuck low pixel.

The disclosed exemplary embodiments relate to a real-time dead pixel detection technology. This technology utilizes the information provided by the image itself, and dynamically adjusts related system thresholds to adapt to a wide range of the image sensing device's usage scenarios, so that it may suit in the embedded system's real-time processing, and still keeps a high detection rate of dead pixels. In the exemplary embodiments, reference information is found from a neighborhood containing the to-be-detected pixel and its adjacent pixels. Moreover, a dead pixel is identified by using the characteristic that the abnormal value of a dead pixel will contaminate the overall response of the neighborhood. The neighborhood of a to-be-detected pixel may take the to-be-detected pixel as the center and may contain its adjacent pixels in every direction and the to-be-detected pixel. The reference information is such as the statistics of a number of pixels in the neighborhood.

Figures 1A, 1B:
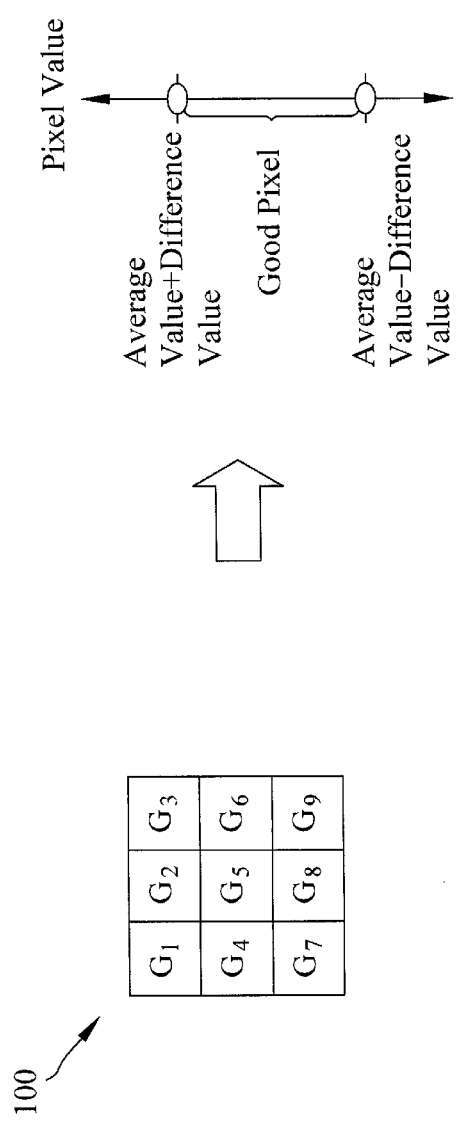
FIG. 1A and FIG. 1B show a schematic view of a method for real-time detecting dead pixels.
Figures 2A, 2B:
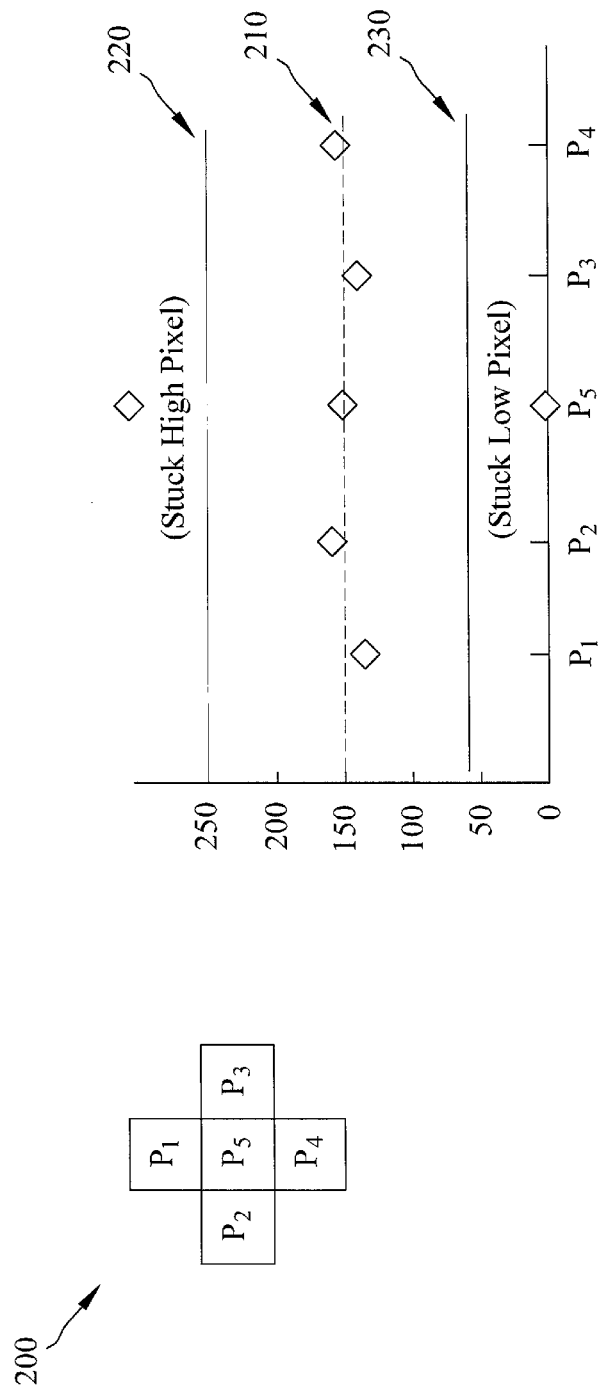
FIG. 2A and FIG. 2B show an average value of a neighborhood's overall response by observing situations of all good pixels, or stuck high pixel or stuck low pixel involved in the neighborhood, according to an exemplary embodiment.

FIG. 2A and FIG. 2B show an average value of a neighborhood's overall response by observing situations of all good pixels, or stuck high pixel or stuck low pixel involved in the neighborhood. For easy illustration, in the instance, it is assumed that the to-be-detected image is a gray-scale image, and a cross-shaped mask with the same color component is used as a neighborhood 200, wherein the neighborhood 200 consists of the to-be-detected pixel $P_5$ and its four adjacent pixels, such as $P_1$, $P_2$, $P_3$ and $P_4$, as shown in FIG. 2A. In the cross-shaped region or mask, pixels $P_2$ and $P_3$ are horizontally adjacent with pixel $P_5$, and pixels $P_1$ and $P_4$ are vertically adjacent with pixel $P_5$.

It may be found that from FIG. 2B, when $P_1 \sim P_5$ in the neighborhood are all good pixels, the average of the overall response of the neighborhood is about 150, referred to as the arrow 210; when there exists a stuck high pixel such as $P_5$ in the neighborhood, the average of the overall response of the neighborhood increases to 200 or more, referred to as the arrow 220; when there exists a stuck low pixel such as $P_5$ in the neighborhood, the average of the overall response of the neighborhood decreases to 100 or below, referred to as the arrow 230. Therefore, the to-be-detected pixel $P_5$ having the abnormal value will affect the overall response of the neighborhood. And it also may be found that a dead pixel and its adjacent good pixels should have a discernible difference.

Figure 3:
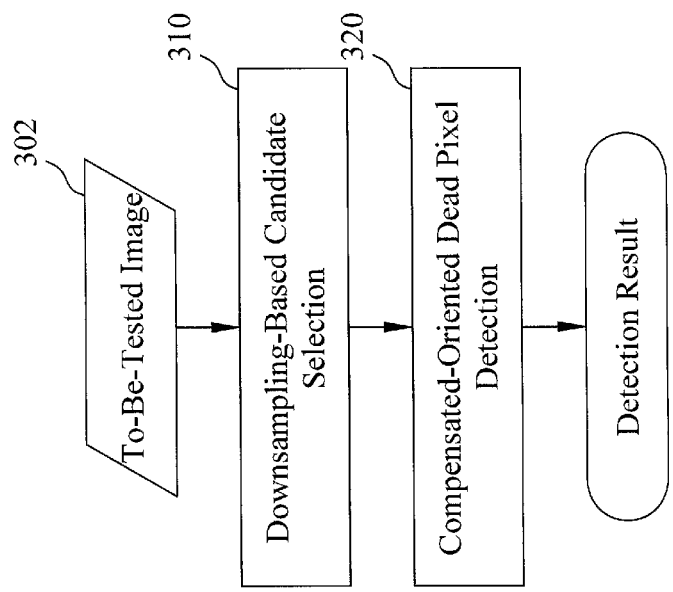
FIG. 3 is a schematic view illustrating two-rounds to perform dead pixel detection for a to-be-tested input image, according to an exemplary embodiment.

Accordingly, the disclosed exemplary embodiments use a progressive detection technique. In a first-round, it screens out potential dead pixel candidates using the downsampling technique coupled with the characteristic of moving average. In a second-round, a compensated-oriented detection is used to determine whether the processing pixel is a dead pixel based on the characteristic that a dead pixel and its adjacent good pixels should have a discernible difference. FIG. 3 is a schematic view illustrating two-rounds to perform the dead pixel detection for a to-be-tested image 302, according to an exemplary embodiment. In the first-round, it performs the downsampling-based candidate selection 310. In the second-round, it performs the compensated-oriented dead pixel detection 320, and generates the detection result.

Figure 4:
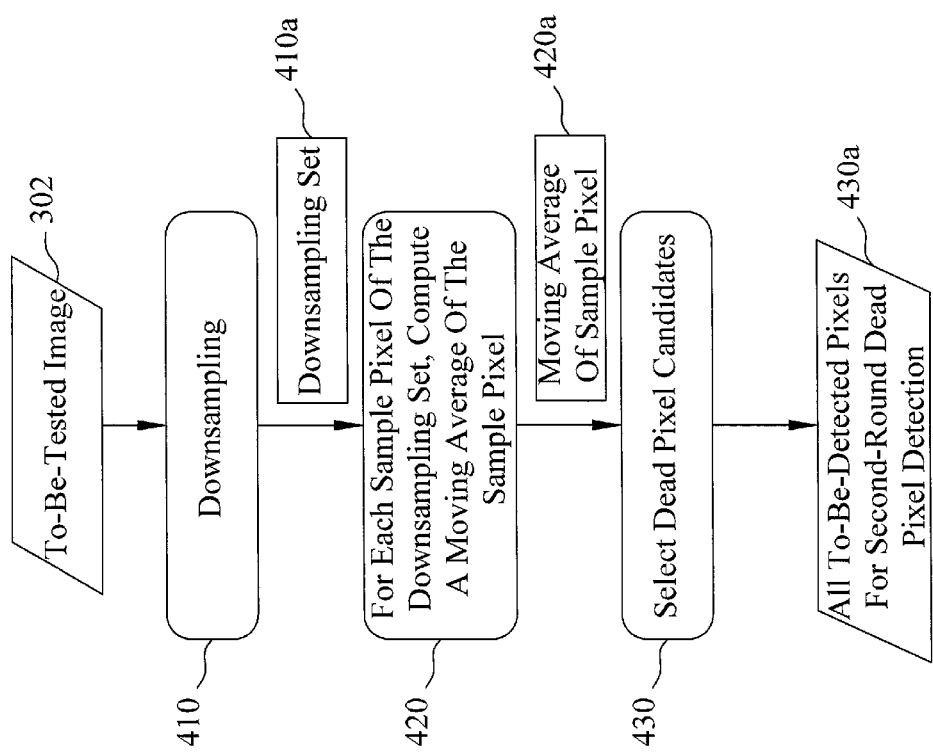
FIG. 4 is a flowchart illustrating the actions executing in the first-round for each to-be-tested input image, according to an exemplary embodiment.
Figure 7:
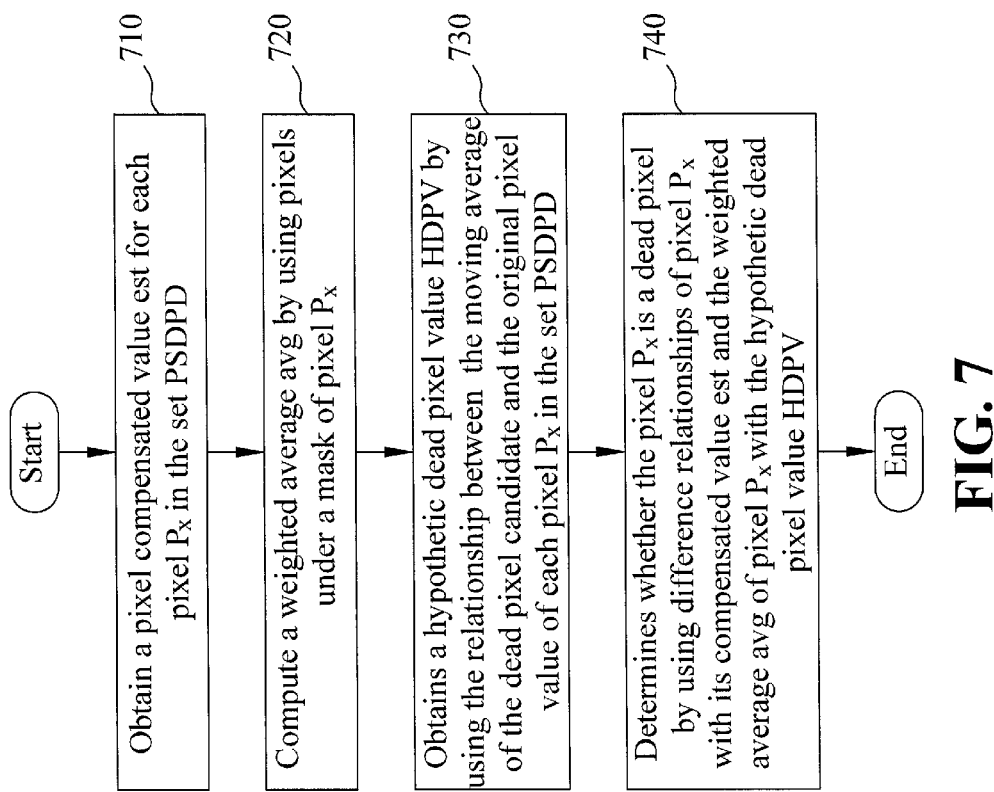
FIG. 7 is a flowchart illustrating the actions executing in the second-round, according to an exemplary embodiment.

The disclosed exemplary embodiments use a progressive detection scheme which firstly screens out the positions of possible dead pixels and then utilizes the weighted average value to highlight the effect of dead pixels. Finally, whether the to-be-detected pixel is a dead pixel or not is determined with the characteristic that each pixel will affect the overall response of each individual region. Thus, even clustered dead pixels may effectively be detected. After that, any compensation technique may be combined according to the application complexity and the required image quality. Accordingly, FIG. 4 is a flowchart illustrating the actions executing in the first-round for a to-be-tested input image, according to an exemplary embodiment; and FIG. 7 is a flowchart illustrating the actions executing in the second-round, according to an exemplary embodiment. For easy illustration, it is assumed that the downsampling factor is k, where k is an integer greater than 1 and varies with the downsampling direction.

In the first-round, as shown in FIG. 4, downsampling 410 is executed for each to-be-tested image 302. That is, for every k pixels in the to-be-tested image 302, one single pixel is taken as a sample pixel. The downsampling may include one or more sampling directions. For example, the sampling direction may be horizontal, vertical, cross-shaped, an oblique line of any angle, any self combination of above directions, any combination of above directions, or any suitable directions or any suitable combination of directions, but the scope of implementation is not limited to these instances. After having performed downsampling 410 to the to-be-tested image 302, a downsampling set 410a may be obtained. The downsampling set 410a is composed of a plurality of sample pixels. When the to-be-tested image 302 is a grayscale image, the image 302 is composed of a plurality of pixels on a single-color plane, while the downsampling set 410a is composed of a plurality of sample pixels on the single-color plane. When the to-be-tested image 302 is a color image, the image 302 is composed of a plurality of pixels on a three-color plane, while the downsampling set 410a is composed of a plurality of sample pixels on the three-color plane.

For each sample pixel of the downsampling set 410a, a moving average of the sample pixel is computed, as shown in step 420. In step 420, the sample pixel is taken as a center, and an outward expanding range is used as a neighborhood of the sample pixel. Based on the neighborhood, the moving average of the sample pixel 420a is extracted out. Wherein the outward expanding range corresponds to the downsampling direction. For example, if it is a horizontal downsampling direction, a range of horizontal expansion is taken as the neighborhood of the sample pixel; while if the downsampling includes horizontal and vertical directions, a range of horizontal and vertical expansions is taken as the neighborhood of the sample pixel. Finally, the union set of the neighborhoods of all sample pixels must be greater than or equal to the to-be-tested image 302. Then dead pixel candidates are selected from the downsampling set 410a by using the moving average of the sample pixel 420a, as shown in step 430. In step 430, whether the sample pixel is a dead pixel candidate is determined according to the relationship of moving average of the sample pixel 420a and its original pixel value in the downsampling set 410a. After step 430 is performed, all to-be-detected pixels for second-round dead pixel detection (PSDPD) 430a are determined. The set formed by all the pixels entering the second-round dead pixel detection is represented by PSDPD.

Figure 5:
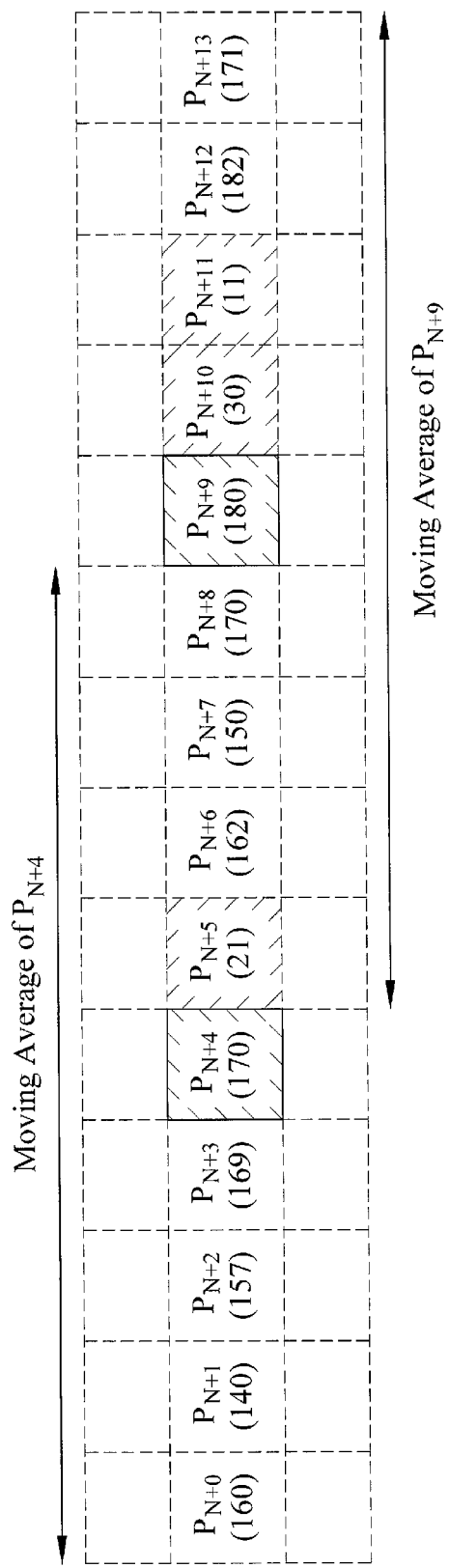
FIG. 5 shows an exemplary executing result for each action in the first-round, according to an exemplary embodiment.

According to the flow of FIG. 4, FIG. 5 shows an exemplary executing result for each action in the first-round, according to an exemplary embodiment. For easy illustration, in the exemplary embodiment, it is assumed that the downsampling is only performed in the horizontal direction and downsampling factor k is equal to 5. $P_{N+i}$ represents a pixel of the to-be-tested image 302, and only pixels $P_{N+0}$ to $P_{N+13}$ are shown in FIG. 5. $P_{N+4}$ and $P_{N+9}$ represent the obtained sample pixels from pixels $P_{N+10}$ to $P_{N+13}$ after downsampling the to-be-tested image 302, while $P_{N+5}$, $P_{N+10}$ and $P_{N+11}$ are pre-defined dead pixels. Each value in the brackets represents a corresponding original pixel value of the pixel. Referring to FIG. 5, according to step 410, downsampling set 410a is obtained after performing downsampling 410 to the to-be-tested image 302, where only a set of two sample pixels $\{P_{N+4}, P_{N+9}\}$ is labeled for the downsampling set. Step 420 is taking each sample pixel such as $P_{N+4}$ as the center, and outward expanding a range. This range includes the sample pixel such as $P_{N+4}$, and a neighborhood corresponding to the downsampling direction. Pixels included in this neighborhood may be for example, the pixels from pixel $P_{N+4-L}$ to pixel $P_{N+4+L}$, and L must be greater than half of the downsampling factor k, wherein assumed L=4, that is, from pixel $P_{N+0}$ to pixel $P_{N+8}$. These pixels serve as a basis for the moving average of sample pixel $P_{N+4}$. Then the moving average of sample pixel $P_{N+4}$ is computed as follows.

$$MA_{N+4}=(160+140+157+169+170+21+162+150+170)/9=144.$$

In other words, the moving average of sample pixel $P_{N+4}$ is the average of original pixel values of all the pixels in the neighborhood of sample pixel $P_{N+4}$. In this example, it is the average of the original pixel values for pixel $P_{N+0}$ to pixel $P_{N+8}$. Similarly, the moving average of sample pixel $P_{N+9}$ is the average of the original pixel values for pixel $P_{N+5}$ to pixel $P_{N+13}$. This moving average $MA_{N+9}$ is computed as follows.

$$MA_{N+9}=(21+162+150+170+180+30+11+182+171)/9=119.$$

In other words, under the example of only considering horizontal downsampling direction and having downsampling factor k, by taking a sample pixel $P_N$ as the center and outward expanding a horizontal range of L pixels (L is a positive integer, and at least greater than half of the downsampling factor k, to ensure that all pixels in the to-be-tested image 302 become the reference basis of at least a moving average), a neighborhood containing the sample pixel $P_N$ will be obtained. The number of pixels contained in the neighborhood varies with one or both of downsampling factor k and the downsampling direction. In the example, the neighborhood contains a total of 2L+1 pixels, and the moving average MA of sample pixel $P_N$ may be computed by the following formula.

$$MA = \frac{\sum_{i=-L}^{L} P_{N+i}}{2 \times L+1}.$$

According to step 430, based on the relationship between the moving average of each sample pixel and the original pixel value of the sample pixel, whether the sample pixel is a dead pixel candidate is determined. The relationship of the moving average MA and the original pixel value $P_j$ of a sample pixel may be expressed as follows: $|P_j - MA| > (w \times MA)$, wherein w is a weight value between 0 and 1. When this relationship holds, it means that the difference between the sample pixel $P_j$ and its moving average is so large that the sample pixel $P_j$ is a dead pixel candidate. Assumed that, weight value w equals the inverse of downsampling factor k, which is 0.2 in the example of FIG. 5. Since $|P_{N+4} - MA_{N+4}| = |170-144| = 26 < 0.2 \times 144$, the difference between the sample pixel $P_{N+4}$ and its moving average is not large enough; therefore sample pixel $P_{N+4}$ is determined as a good pixel. The relationship is also used to determine another sample pixel $P_{N+9}$. Since $|P_{N+9} - MA_{N+9}| = |180-119| = 61 > 0.2 \times 119$, the difference between the sample pixel $P_{N+9}$ and its moving average is large enough, so sample pixel $P_{N+9}$ is determined as a dead pixel candidate. Accordingly, it is determined that all pixels contained in the neighborhood of the dead pixel candidate $P_{N+9}$ are to-be-detected pixels in the second-round, which are pixel $P_{N+9-4}$ to pixel $P_{N+9+4}$. Here, the neighborhood is equivalent to the neighborhood of computing moving average. Therefore, step 430 results in a set of pixels for second-round dead pixel detection PSDPD, which contains pixel $P_{N+5}$ to pixel $P_{N+13}$.

It may be known from the example in FIG. 5, originally, there are 14 pixels (i.e., $P_{N+0} \sim P_{N+13}$) requiring separate dead pixel detection. However, it may be reduced to 9 pixels (pixel $P_{N+5}$ to pixel $P_{N+13}$) after screening of the first-round according to FIG. 4. So that in the case of a big image, more computations can be omitted. Also, in the first-round of the exemplary embodiments, after introducing moving average to determine suspicious dead pixels, the effect of dead pixels may be highlighted in sample pixels $P_{N+4}$ and $P_{N+9}$, thereby increasing the accuracy of determining dead pixel candidates.

Figure 6:
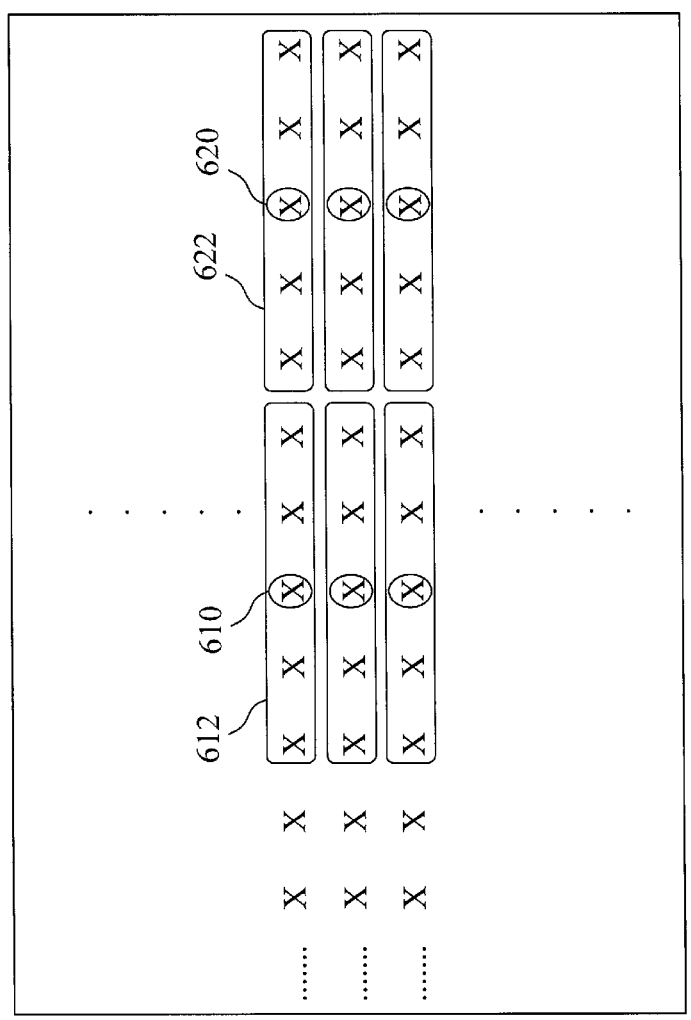
FIG. 6 is a schematic view for calculating moving average of sample pixels by outward expanding a range of each sample pixel on a downsampling set of a to-be-tested image, according to an exemplary embodiment.

Accordingly, FIG. 6 is a schematic view for calculating moving average of sample pixels by outward expanding a range of each sample pixel on a downsampling set of a to-be-tested image, according to an exemplary embodiment. The exemplary embodiment assumed that only downsampling in the horizontal direction is performed, and downsampling factor k is equal to 5, i.e., taking one pixel from every 5 pixels as a sample pixel (i.e., every little circle in FIG. 6). Then take each sample pixel in the downsampling set as the center and horizontally expand out at least 5/2 pixels, i.e. two pixels, to compute the corresponding moving average. Wherein a rectangle represents as the neighborhood of a sample pixel by expanding horizontally. For example, in the downsampling set, the neighborhood 612 is a horizontal expanded area of sample pixel 610, and the neighborhood 622 is a horizontal expanded area of sample pixel 620. Finally, the union set of the neighborhoods of all sample pixels must be at least equal to the to-be-tested image 302.

After screening out the dead pixel candidates, the second-round dead pixel detection for each pixel $P_x$ in the set PSDPD is performed. FIG. 7 is a flowchart illustrating the actions executing in the second-round, according to an exemplary embodiment. Referring to FIG. 7, a compensated value est for each pixel $P_x$ in the set PSDPD is obtained, as shown in step 710. For example, it may use an interpolation method by taking a statistical value (e.g., average value) of pixels near the pixel $P_x$ as the compensated value. Then, it may use pixels under a mask of pixel $P_x$, to compute a weighted average avg, as shown in step 720.

The weighted average avg may be obtained by computing the following formula.

$$avg = \frac{\sum_{s=0}^{m-1} P_s + m \times P_x}{2 \times m},$$

wherein pixels covered by this mask include pixel $P_x$ and its adjacent m pixels labeled by $P_0, P_1, \ldots, P_{m-1}$, and m is a positive integer. In the formula for computing the weighted average avg, the ratio of pixel $P_x$ to its adjacent m pixels is raised to 1:1; that is, by multiplying pixel $P_x$ with m. In other words, the computation of weighted average avg of pixel $P_x$ considers adjacent pixels of pixel $P_x$, and increases the weight of pixel $P_x$.

After computing the weighted average of pixel $P_x$, in step 730, a hypothetic dead pixel value (HDPV) will be obtained by using the relationship between the moving average of the dead pixel candidate and the original pixel value of each pixel $P_x$ in the set PSDPD. The hypothetic dead pixel value HDPV is the original pixel value of a to-be-detected pixel, and among all the absolute difference values of the original pixel value of each to-be-detected pixel in the set PSDPD and the moving average of the dead pixel candidate, the absolute difference value between the original pixel value of the to-be-detected pixel and the moving average of the dead pixel candidate is the largest.

After having obtained the hypothetic dead pixel value HDPV, the exemplary embodiments then observe a first absolute difference value dif between each pixel $P_x$ in the set PSDPD and the corresponding compensated value est, i.e., the absolute difference value dif=|est−$P_x$|, and a second absolute difference value between the weighted average avg of pixel $P_x$ and the hypothetic dead pixel value HDPV, i.e., the absolute difference value |avg−HDPV|. In other words, the exemplary embodiments may determine whether the pixel $P_x$ is a dead pixel according to the two absolute difference values, i.e., |est−Px| and |avg−HDPV|. Accordingly, in step 740, it determines whether the pixel $P_x$ is a dead pixel by measuring difference of pixel $P_x$ with its compensated value est, and weighted average avg of pixel $P_x$ with the hypothetic dead pixel value HDPV.

Accordingly, discernible difference exists between a dead pixel and its adjacent good pixels, thus affecting the overall visual effect of the to-be-tested image. Therefore, to discern the difference of a processing pixel with its adjacent pixels, a possible pixel value of the processing pixel is firstly predicted by utilizing its adjacent pixels, and then discrimination is performed with the discrepancy between the predicted value and the original pixel value of the processing pixel. This predicted value is equal to the aforementioned compensated value. With the thorough information carried by the to-be-tested-image, the exemplary embodiments may observe that how much of the difference is distinguishable for a dead pixel. It is found that, when a stuck low pixel exists in a region or mask, the average value of all pixels within the region or mask will drop slightly. Therefore, in order to highlight such effect upon the processing pixel, the exemplary embodiment increases the ratio of the processing pixel $P_x$ when computing the weighted average avg. Accordingly, the ratio of the processing pixel to its adjacent pixels is 1:1 such as mentioned above.

For easy illustration, the following takes stuck low pixel and stuck high pixel as examples. Since the pixel value of stuck low pixel is close to 0 (that is, hypothetic dead pixel value HDPV is close to 0), dif which is the absolute difference value between the stuck low pixel and its compensated value, is close to the value of good pixels as shown in FIG. 8A. However, the weighted average avg of processing pixel $P_x$ being a stuck low pixel will be approximately reduced to 50% of the value of the neighboring good pixels. Therefore, dif is significantly greater than the absolute difference value between the weighted average avg and the hypothetic dead pixel value HDPV, i.e., |avg−0|. According to the exemplary embodiments, the discrepancy between avg and HDPV is the basis for identifying dead pixels.

Unlike the stuck low pixel, the weighted average of processing pixel $P_x$ being stuck high will be unusual high, and therefore the determination condition should be different. It can be found that the low response of the stuck low pixel results in a determination condition based on a lower bound of 0 (i.e. hypothetic dead pixel value HDPV is close to 0). However, the stuck high pixel tends to increase the overall response. Therefore, the determination condition should adapt to an upper bound of 255 (i.e. hypothetic dead pixel value HDPV is close to 255) for detecting stuck high pixels. As shown in FIG. 8B, |avg−255| is taken as the basis for identifying stuck high pixels.

Figure 9:
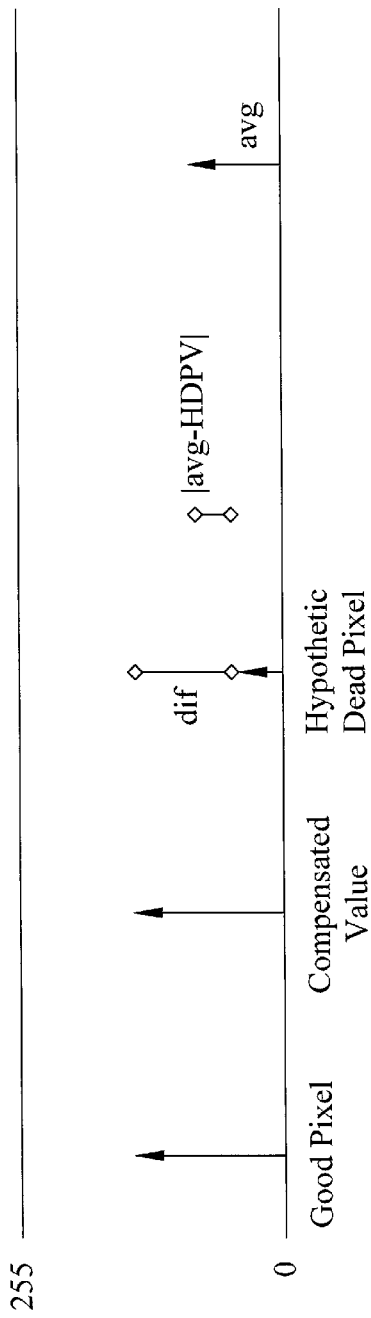
FIG. 9 is a schematic view of taking the absolute difference value between a hypothetic dead pixel value HDPV and a weighted average as a criterion to detect dead pixel with different response status, according to an exemplary embodiment.

Therefore, according to one exemplary embodiment shown in FIG. 9, it may take |avg−HDPV|, i.e. the absolute difference value between the weighted average avg and the hypothetic dead pixel value HDPV, as the determination criterion to detect dead pixels for each response status. In other words, the processing pixel $P_x$ is checked to see whether |est−$P_x$| is greater than |avg−HDPV|. If so, it is a dead pixel; otherwise, it is a good pixel.

Figure 10:
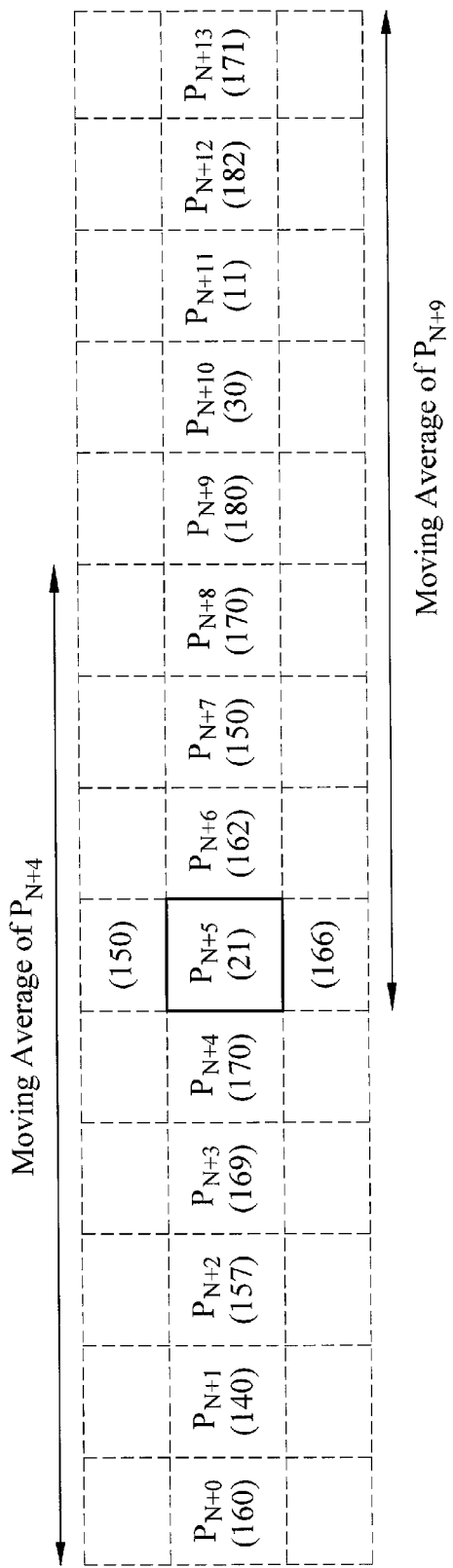
FIG. 10 shows an exemplary execution result for each action in the second-round, according to an exemplary embodiment.

It may be found from FIG. 5 that the PSDPD entering into the second-round includes pixels from $P_{N+5}$ to $P_{N+13}$. FIG. 10 shows an exemplary executing result for each action in the second-round for the pixel $P_{N+5}$, according to the flowchart of FIG. 7 and the determination criterion of FIG. 9. According to steps 710 and 720, it computes the compensated value est and the weighted average avg of the pixel $P_{N+5}$ as following, wherein a cross-shaped region or mask of pixel $P_{N+5}$ covering pixel $P_{N+5}$ and pixels of its upper, lower, right, and left sides is used to compute the avg.

$$\text{est}=(P_{N+4}+P_{N+6})/2=(170+162)/2=166,$$

$$\text{avg}=(170+162+150+166+4\times21)/8=91.$$

Then according to step 730, it determines the hypothetic dead pixel value HDPV based on the absolute difference value between the moving average of dead pixel candidate $P_{N+9}$ (i.e. $MA_{N+9}$=119) and the original pixel values of each pixel $P_x$ in the set PSDPD. Since HDPV equals the pixel value of the to-be-detected pixel $P_x$ having the largest absolute difference value between each to-be-detected pixel $P_x$ in PSDPD and the moving average, HDPV is the pixel value of $P_{N+11}$, i.e., 11.

Finally, according to step 740, it determines if $P_{N+5}$ is a dead pixel by computing the absolute difference value dif between $P_{N+5}$ and its compensated value est, and the absolute difference value between the weighted average avg of $P_{N+5}$ and the hypothetic dead pixel value HDPV, i.e.

$$\text{dif}=|\text{est}-P_{N+5}|=|166-21|=145,$$

$$|\text{avg}-\text{HDPV}|=|91-11|=80,$$

Since the dif is greater than |avg−HDPV|, pixel $P_{N+5}$ is detected as a dead pixel.

Similarly, for pixel $P_{N+6}$ being the center of a cross-shaped mask, the est and the dif are computed as 85 and 77 respectively. The weighted average avg of $P_{N+6}$ and the absolute difference value between the avg of $P_{N+6}$ and HDPV are computed as follows:

$$\text{avg}=(21+150+170+156+4\times162)/8=143,$$

$$|\text{avg}-\text{HDPV}|=|143-11|=132,$$

Since the dif is smaller than |avg−HDPV|, pixel $P_{N+6}$ is detected as a good pixel. Similarly, for the remaining to-be-detected pixels in PSDPD ($P_{N+7}$~$P_{N+13}$), the flowchart in FIG. 7 may be used to detect whether dead pixel exists.

Figure 11:
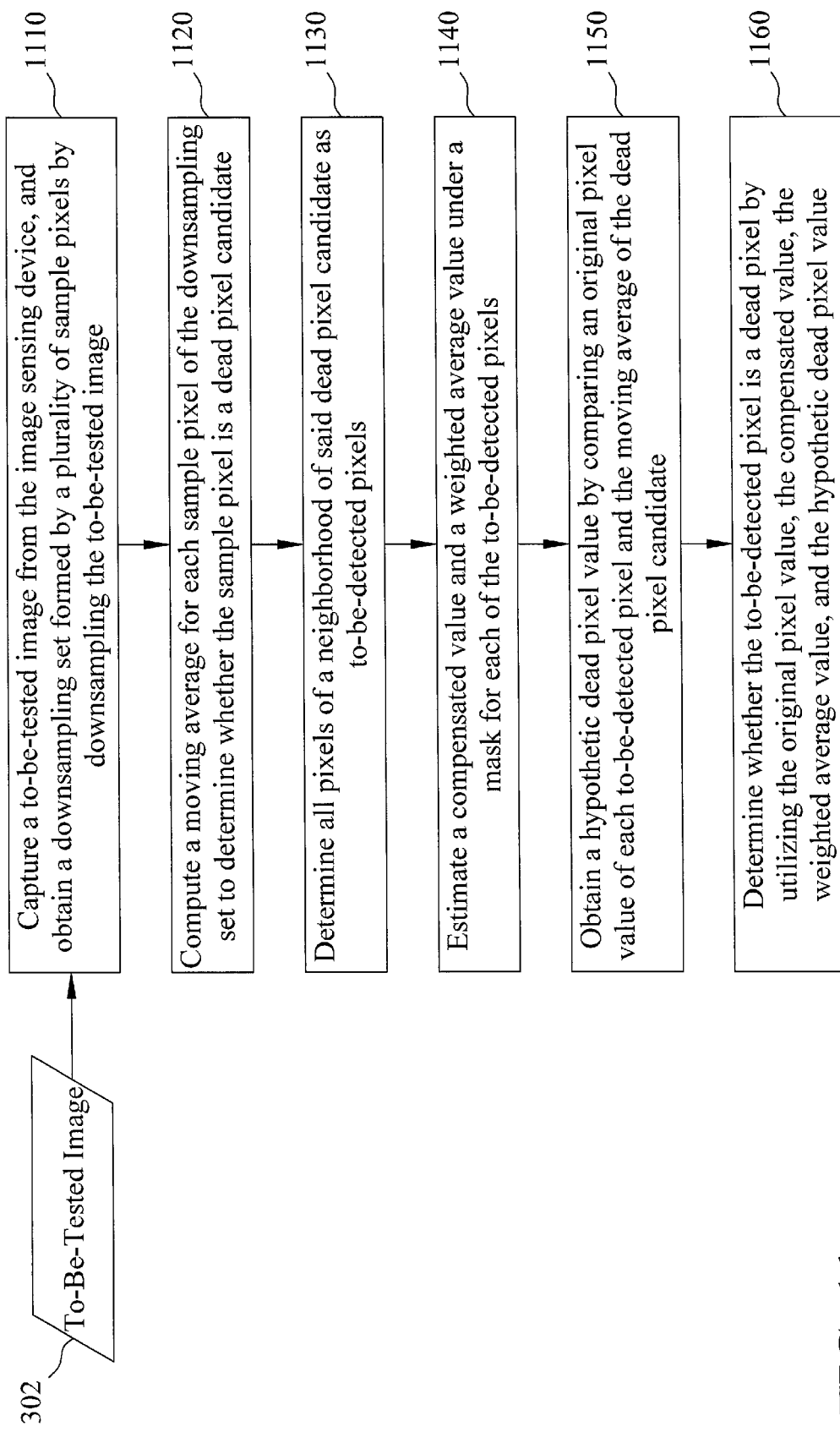
FIG. 11 shows a method for detecting dead pixels, according to an exemplary embodiment.

In summary, FIG. 11 shows a method for detecting dead pixels, according to an exemplary embodiment. The method may be adapted to an image sensing device. Referring to FIG. 11, the method comprises: capturing a to-be-tested image from the image sensing device, and obtaining a downsampling set formed by a plurality of sample pixels by downsampling the to-be-tested image (step 1110); computing a moving average for each sample pixel of the downsampling set to determine whether the sample pixel is a dead pixel candidate (step 1120); determining all pixels of a neighborhood of said dead pixel candidate as to-be-detected pixels (step 1130); estimating a compensated value and a weighted average value under a mask for each of the to-be-detected pixels (step 1140); obtaining a hypothetic dead pixel value by comparing an original pixel value of each to-be-detected pixel and the moving average of the dead pixel candidate (step 1150); and determining whether the to-be-detected pixel is a dead pixel by utilizing the original pixel value, the compensated value, the weighted average value, and the hypothetic dead pixel value (step 1160).

Step 1110, step 1120, and step 1130 are the executing actions in the aforementioned first-round, and their example and details of operation are shown in FIG. 4, FIG. 5, and FIG. 6; step 1140, step 1150, and step 1160 are the executing actions in the aforementioned second-round, and their example and details of operation in an exemplary embodiment are shown in FIG. 7, FIG. 8A, FIG. 8B, FIG. 9, and FIG. 10; and those are not repeated here.

Figure 12:
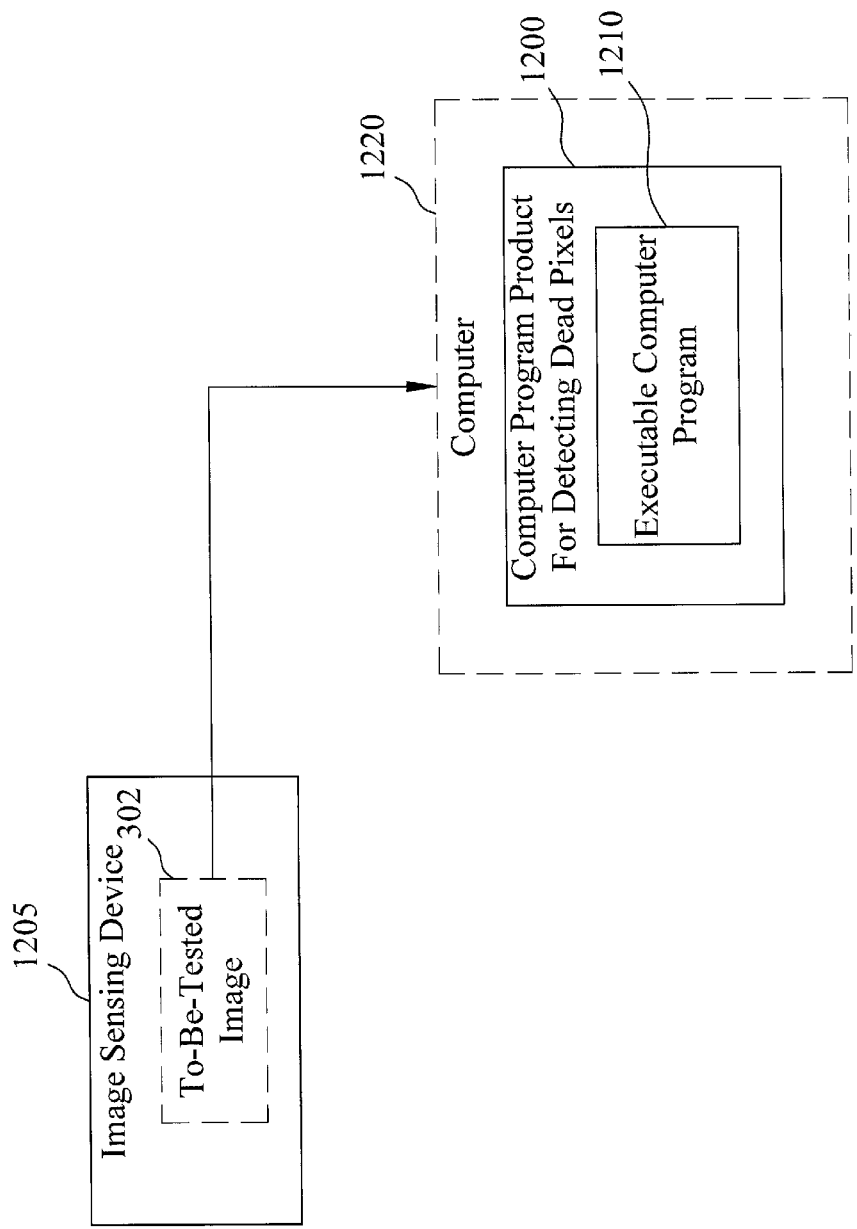
FIG. 12 shows a computer program product for detecting dead pixels, according to an exemplary embodiment.

FIG. 12 shows a computer program product for detecting dead pixels, according to an exemplary embodiment. The computer program product operates with an image sensing device. For example, the image sensing device may be but not limited to, an image sensing device array. Referring to FIG. 12, the computer program product for detecting dead pixels 1200 comprises an executable computer program 1210. The computer program 1210 is stored in a computer readable storage medium, and under control of a computer 1220 (such as an advanced Reduced Instruction Set Computing (RISC) machine series computer or any suitable computer) to execute actions in the aforementioned first-round and second-round, that is, to perform: obtaining a downsampling set formed by a plurality of sample pixels by downsampling a to-be-tested image 302 captured from an image sensing device 1205; computing a moving average for each sample pixel of the downsampling set to determine whether the sample pixel is a dead pixel candidate; determining all pixels of a neighborhood of said dead pixel candidate as to-be-detected pixels; estimating a compensated value and a weighted average value under a mask for each of the to-be-detected pixels; obtaining a hypothetic dead pixel value by comparing an original pixel value of each to-be-detected pixel and the moving average of the dead pixel candidate; and determining whether the to-be-detected pixel is a dead pixel by using the original pixel value, the compensated value, the weighted average value, and the hypothetic dead pixel value.

As mentioned earlier, the to-be-tested image 302 may be a color or grayscale image, executing actions in the aforementioned first-round and second-round, examples and details of operation have been mentioned above. Computer 1220, for example, may be an advanced RISC machine series system or any suitable computer.

Therefore, the exemplary embodiments provide a downsampling-based and compensation-oriented dead pixel detection technology, and at least have the following features: using progressive detection that may rapidly screen out possible dead pixel position; may utilize the weighted average to highlight the effect of dead pixels; may determine whether a pixel is a dead pixel by the characteristic that each pixel will affect the overall response of each individual region, which is also effective for clustered dead pixels; may quickly obtain dead pixel detection results; may reduce demand for data storage and data transmission in embedded systems with limited resources, and may reduce power consumption; may be suitable for a variety of color images (including color or grayscale images); may effectively detect expected and unexpected dead pixels; and with image adaptability.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A dead pixel detection method, said method comprising:
   capturing a to-be-tested image, and obtaining a downsampling set formed by a plurality of sample pixels by downsampling said to-be-tested image;
   computing a moving average for each sample pixel of said downsampling set to determine whether the sample pixel is a dead pixel candidate;
   determining all pixels of a neighborhood of said dead pixel candidate as to-be-detected pixels;
   estimating a compensated value and a weighted average value under a mask for each of the to-be-detected pixels;
   obtaining a hypothetic dead pixel value by comparing an original pixel value of each to-be-detected pixel and the moving average of said dead pixel candidate; and
   determining whether said to-be-detected pixel is a dead pixel by using the original pixel value, the compensated value, the weighted average value, and the hypothetic dead pixel value.

2. The dead pixel detection method as claimed in claim 1, said method performs the downsampling for all pixels in said to-be-tested image, by taking one pixel from every k pixels as said sample pixel, where k is an integer greater than 1 and varies with one or more downsampling directions.

3. The dead pixel detection method as claimed in claim 2, wherein said method takes said sample pixel as a center and outward expands a range as a neighborhood of said sample pixel, and number of pixels contained in said neighborhood of said sample pixel varies with k.

4. The dead pixel detection method as claimed in claim 3, wherein a direction of the outward expanding corresponds to a downsampling direction of the downsampling, and number of pixels contained in said neighborhood of said sample pixel varies with said k and the downsampling direction.

5. The dead pixel detection method as claimed in claim 1, wherein computing said moving average includes:
   taking said sample pixel as a center, outward expanding a range as a neighborhood of said sample pixel; and
   calculating an average of original pixel values of all pixels of said neighborhood of said sample pixel.

6. The dead pixel detection method as claimed in claim 5, wherein a direction of the outward expanding corresponds to a downsampling direction of the downsampling, and number of pixels contained in said neighborhood of said sample pixel varies with the downsampling direction.

7. The dead pixel detection method as claimed in claim 5, wherein a union set of a plurality of neighborhoods of all sample pixels is at least equal to said to-be-tested image.

8. The dead pixel detection method as claimed in claim 1, said method determines whether said sample pixel is said dead pixel candidate by using a relationship between the moving average of said sample pixel and the original pixel value of said sample pixel.

9. The dead pixel detection method as claimed in claim 8, wherein when an absolute difference value between the original pixel value of said sample pixel and said moving average is greater than said moving average multiplied by a weight value between 0 and 1, said sample pixel is said dead pixel candidate.

10. The dead pixel detection method as claimed in claim 1, wherein the neighborhood of said dead pixel candidate is equivalent to a neighborhood of calculating the moving average.

11. The dead pixel detection method as claimed in claim 1, wherein said compensated value is a statistical value of a plurality of adjacent pixel values of said to-be-detected pixel.

12. The dead pixel detection method as claimed in claim 1, wherein the estimating said weighted average value considers a plurality of adjacent pixels of said to-be-detected pixel, and increases weight of said to-be-detected pixel.

13. The dead pixel detection method as claimed in claim 1, wherein said hypothetic dead pixel value is the original pixel value of said to-be-detected pixel, and among absolute difference values between the original pixel value of each pixel in said neighborhood and the moving average of said dead pixel candidate, an absolute difference value between the original pixel value of said to-be-detected pixel and the moving average of said dead pixel candidate is a largest absolute difference value.

14. The dead pixel detection method as claimed in claim 1, said method utilizes a first absolute difference value between the original pixel value of said to-be-detected pixel and said compensated value, and a second absolute difference value of said weighted average value and said hypothetic dead pixel value to determine whether said to-be-detected pixel is said dead pixel.

15. The dead pixel detection method as claimed in claim 14, wherein said to-be-detected pixel is said dead pixel when said first absolute difference value is greater than said second absolute difference value.

16. The dead pixel detection method as claimed in claim 1, wherein the to-be-tested image is captured from an image sensing device.

17. A non-transitory computer program product for detecting dead pixels, comprising: an executable computer program, the computer program is stored in a storage medium and under control of a computer to perform: capturing a to-be-tested image, and obtaining a downsampling set formed by a plurality of sample pixels by downsampling said to-be-tested image; computing a moving average for each sample pixel of the downsampling set to determine whether the sample pixel is a dead pixel candidate; determining all pixels of a neighborhood of said dead pixel candidate as to-be-detected pixels; estimating a compensated value and a weighted average value under a mask for each to-be-detected pixel; obtaining a hypothetic dead pixel value by comparing an original pixel value of each to-be-detected pixel and the moving average of said dead pixel candidate; and determining whether said to-be-detected pixel is a dead pixel by using the original pixel value, the compensated value, the weighted average value, and the hypothetic dead pixel value.

18. The non-transitory computer program product as claimed in claim 17, wherein when said to-be-tested image is a grayscale image, said to-be-tested image is formed by a plurality of pixels on a single-color plane, and said downsampling set is formed by the plurality of sample pixels on said single-color plane.

19. The non-transitory computer program product as claimed in claim 17, wherein when said to-be-tested image is a color image, said to-be-tested image is formed by a plurality of pixels on a three-color plane, and said downsampling set is formed by the plurality of sample pixels on said three-color plane.

20. The non-transitory computer program product as claimed in claim 17, wherein the to-be-tested image is captured from an image sensing device.

21. The non-transitory computer program product as claimed in claim 20, wherein said image sensing device is an image sensing device array.

22. The non-transitory computer program product as claimed in claim 17, wherein said computer is an advanced reduced instruction set computing machine series computer.

* * * * *